D. P. FERGUSON.
Cotton-Seed Planters.
No. 144,607. Patented Nov. 18, 1873.
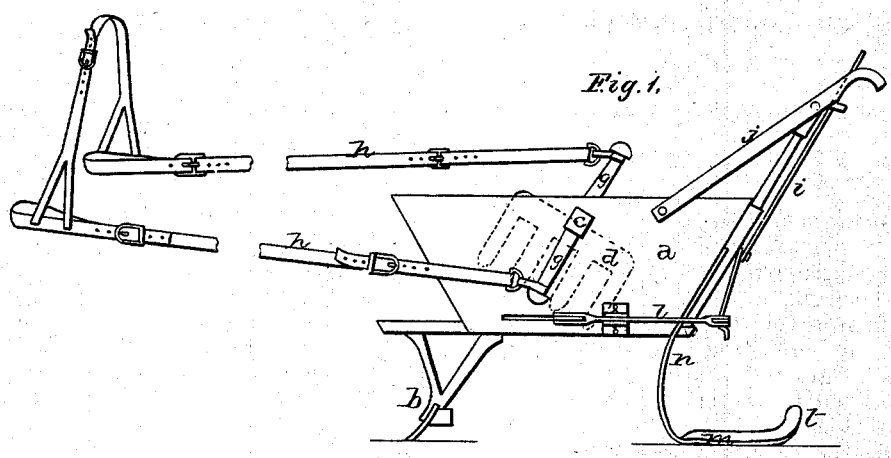
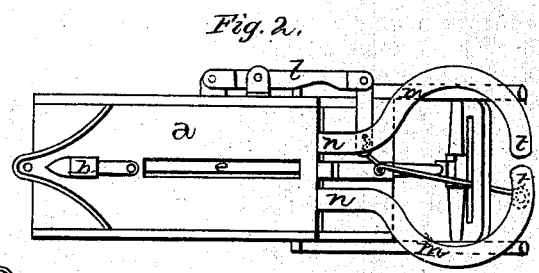
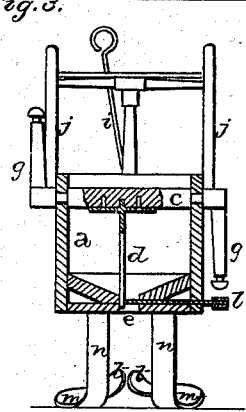
WITNESSES
Edw. F. Brown
Harry Coleman
Daniel P. Ferguson
INVENTOR
By Daniel Breed
Attorney

UNITED STATES PATENT OFFICE.

DANIEL P. FERGUSON, OF JONESBOROUGH, GEORGIA.

IMPROVEMENT IN COTTON-SEED PLANTERS.

Specification forming part of Letters Patent No. 144,607, dated November 18, 1873; application filed October 7, 1873.

*To all whom it may concern:*

Be it known that I, DANL. P. FERGUSON, of Jonesborough, in the county of Clayton and State of Georgia, have invented certain new and useful Improvements in Cotton-Seed Planters; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in cotton-seed planters; and it consists in, first, operating the stirrer by means of straps attached to the front legs of the horse, and to two cranks, one extending upward and the other downward from the shaft of the stirrer; second, the construction of the covering device, all of which will be more fully described hereafter.

Figure 1 is a side elevation of my invention. Fig. 2 is an inverted view, and Fig. 3 a cross-section, of the same.

*a* represents the frame or hopper, of any desired size or construction, which has the plow *b* secured to the under side of its front end for opening the furrow to receive the seed or fertilizer being sown. Across the top of the hopper is provided a rocking bar or shaft, *c*, to the under side of which is secured a suitable stirring device, *d*, which prevents the seed or fertilizer from clogging the opening *e*. To each end of this shaft is secured a crank, *g*, which extend in opposite directions, and which are connected by the straps *h* to the fore legs of the animal drawing the planter. These straps are made adjustable in length by means of buckles, so that they can be made to suit animals of different sizes. As the animal steps forward, at each step one of the cranks is drawn forward by the strap, so that the shaft and stirrer are kept constantly reciprocating, and the seed or fertilizer prevented from clogging together. Pivoted to the rear end of the hopper is a hand-lever, *i*, which extends up between the two handles *j*, in convenient position for the operator, the lower end of which is attached to the pivoted lever *l*, which operates the slide *o* for regulating the size of the opening *e*, and thus governs the feed at will. To the rear end of the hopper are secured two steel plates or coverers, *n*, which extend vertically down to the earth, and then are curved backward, as shown in Fig. 2. The front edge of the curved portion *m* is sharpened, so that as it moves over the ground it cuts away all grass and weeds, and any small inequalities of the earth. The rear portions *t* of the curve, which extend inward, have their ends curved upward, as shown in Fig. 1, so as to scrape together the dirt at this point, and form a small ridge over the seed. These plates are made of steel, so that, should they be caught by roots or other obstructions, they will readily yield and spring over them without being broken.

This machine may be used to plant corn, pease, and other similar seeds, or may be used to sow any kind of fertilizers.

Having thus described my invention, I claim—

1. In combination with the hopper *a* and stirrer *d*, having the cranks *g g* extending in opposite directions from the shaft C, the draft-straps *h h*, as specified.

2. The plates *n*, having the sharpened edges *m* and the inwardly-projecting ends *t*, substantially as shown.

In testimony that I claim the foregoing I have hereunto set my hand this 7th day of October, 1873.

DANIEL P. FERGUSON.

Witnesses:
 DANIEL BREED,
 EDM. F. BROWN.